United States Patent [19]
Memeger, Jr.

[11] Patent Number: 5,968,598
[45] Date of Patent: Oct. 19, 1999

[54] PPD-T STRUCTURAL COMPOSITES

[75] Inventor: Wesley Memeger, Jr., Wilmington, Del.

[73] Assignee: E.I. Du Pont de Nemours and Company, Wilmington, Del.

[21] Appl. No.: 09/151,311

[22] Filed: Sep. 11, 1998

Related U.S. Application Data

[60] Provisional application No. 60/058,932, Sep. 15, 1997.

[51] Int. Cl.⁶ ........................................................ C08J 9/02

[52] U.S. Cl. .................... 427/389.9; 521/77; 521/183; 521/184; 521/134

[58] Field of Search ........................... 427/389.9; 521/77, 521/183, 184, 134

[56] References Cited

U.S. PATENT DOCUMENTS

| | | | |
|---|---|---|---|
| 3,770,669 | 11/1973 | Reske et al. | 260/25 D |
| 4,178,419 | 12/1979 | Memeger, Jr. | 521/89 |
| 4,226,949 | 10/1980 | Memeger, Jr. | 521/184 |
| 4,940,629 | 7/1990 | Weber et al. | 428/213 |

*Primary Examiner*—Morton Foelak

[57] ABSTRACT

Composite materials made wholly from aromatic polyamides are prepared, which have the advantage of better performance and less delamination than composites composed of chemically distinct components. The foam matrix for such composites is prepared using N,N'-dialkylated aromatic polyamide. Both fiber reinforced foam structural forms and foam/felt laminates are prepared.

6 Claims, 2 Drawing Sheets

PPD-T STRUCTURAL COMPOSITES

This is application claims the benefit of U.S. Provisional Application 60/058,932 filed Sep. 15, 1997.

FIELD OF INVENTION

This invention relates to rigid aromatic polyamide (aramid) composites and a process for their preparation.

TECHNICAL BACKGROUND OF THE INVENTION

High strength, low weight structural materials are typically prepared by embedding fibers in foams to make a composite. Better performance and less delamination is seen when the fiber and matrix materials are similar in chemical, physical, and thermal properties.

Foam composite materials that are formable, have high strength to weight ratios, good mechanical strength and resistance to degradation at high temperatures in the presence of air have long been sought after. Such foam composites are particularly needed in uses where high temperatures are encountered in structures wherein mechanical strength of the composite is required. Another advantage is offered if the foam composite is machinable. Some uses are flex-circuit heater supports, solar panels (portable), fire walls, aircraft and race car composites, pleasure boats, engine compartments, racing hulls, bulk-heads, air-drop skids, ovens, fire proof fuel storage, fire shields (light weight), light weight (glider) aircraft constructs, hang glider structured parts, helmets, sports protective gear, military equipment, bearings, friction pads in high temp. service, aircraft shipping containers (freight), explosion containment devices, heating pads and food warmers, high temperature pallets, autoclaves and sterilizers.

Aromatic polyamides (aramids) are known to have many desirable properties such as good resistance to oxidation at high temperature, a high melting point, low flammability, high stiffness and good chemical resistance. Traditional methods of preparing solid, formable aramid materials cannot be used because the aramids tend to decompose before melting. Light weight foamed aramid components have been prepared (U.S. Pat. Nos. 4,178,419 and 4,226,949) but they do not have high structural strength.

Composite materials with high structural strength have been made using aramid fibers in a variety of matrix polymers. These, however, have several disadvantages since the matrix materials exhibit lower temperature and chemical resistance than the aramid fibers. Additionally, since the matrix and fibers are chemically distinct materials the interfacial bonding between them can be weak and subject to separation, leading to delamination. An obstacle to the preparation of composite materials wherein a matrix and a fiber are composed of similar materials is that they do share many properties, such as high melting points. It is difficult to embed such fibers in the matrix material when it does not form a stable melt or is a fiber degrading solution. This obstacle was overcome in the instant invention by the use of a fusable precursor to the aramid foam matrix. The foams are prepared using N,N'-dialkyl aromatic polyamides, which have different solubility properties from the non-alkylated form used for the embeddable fibers. After the matrix material and fibers are combined, the composite is heated and the matrix is dealkylated, forming the foam and converting the matrix to the same polyamide as the fiber.

SUMMARY OF THE INVENTION

This invention relates to rigid fiber reinforced aromatic foam polyamide (aramid) or foam/felt composite, formed from an aromatic polyamide matrix having an aramid fiber embedded therein.

More specifically this invention relates to such a reinforced polyamide composite, as described above, wherein said polyamide matrix is prepared by dealkylation of an N-alkyl aromatic polyamide.

The invention also concerns a process for making a rigid fiber reinforced aromatic polyamide composite comprising the following steps:

(a) preparing a matrix from an aromatic N,N'-dialkyl polyamide;

(b) embedding in said matrix a non-alkylated aromatic polyamide in fiber form, wherein the solubility of the non-alkylated fiber differs from that of the alkylated matrix so as to form a composite of the two types of aromatic polyamides; and (c) heating said composite so as to dealkylate the matrix and so as to convert the matrix to the same polyamide as the fiber.

Suitable polyamides for preparing the composites are N-alkyl groups of aromatic diamines having 2–8 carbon atoms and at least one β-hydrogen atom. A preferred material for the matrix is N,N'-dialkyl aromatic polyamide.

This invention also relates to a process for making a felt composite comprising preparing the fel, as described in U.S. Pat. No. 4,361,619, which is incorporated herein by reference, then coating said felt material composite with a matrix of N,N'dialkyl polyamide, then heating said felt composite so as to dealkylate the coating and so as to convert the coating to the same polyamide as the polyamide felt. A specific process for making an aromatic polyamide felt composite comprises:

(a) preparing the felt according to the following steps;
  (i) passing aromatic polyamide fibers through a suitable carding machine to provide a web;
  (ii) cross-lapping the carded web from the carding machine and combining the resulting batt into a layered batt, if necessary, to provide the desired weight;
  (iii) lightly needling the layered batt on one or both sides using a needle loom; and
  (iv) further needling the batt on one or both sides to produce a felt;

(b) coating said felt with N,N'-dialkyl polyamide, wherein the solubility of the coating differs from that of the felt; and (c) then heating said coated felt so as to dealkylate the coating and so as to convert the coating to the same polyamide as the polyamide felt and so that a composite is formed at the interface of the coating and the felt.

DETAILED DESCRIPTION OF THE INVENTION

Figure 1:
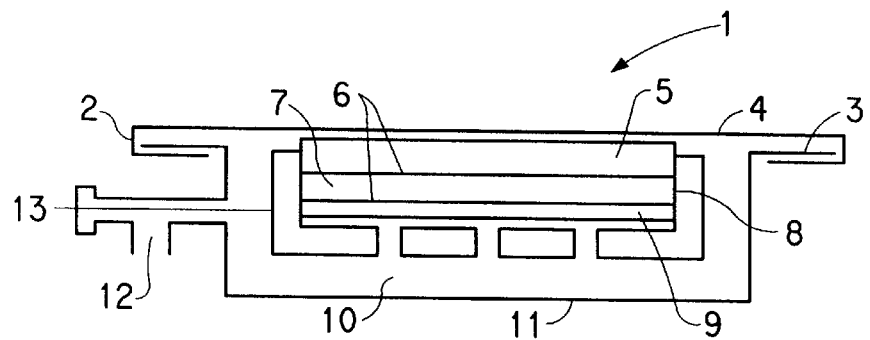
FIG. 1 is a schematic of a vacuum bag apparatus.

By "PPD-T" it is meant poly(imino-1,4-phenyleneiminocarbonyl-1,4-phenylenecarbonyl), also known as 1,4-benzenediamine-terephthalic acid copolymer, p-phenylenediamine-terephthaldehyde copolymers, poly(1, 4-phenylene terephthalamide), poly(imino-p-phenyleneiminocarbonyl-p-phenylenecarbonyl), and poly(p-phenylene terephthalamide). Kevlar® is the DuPont trademark for PPD-T.

By "PPD-I" it is meant poly(imino-1,4-phenyleneiminocarbonyl-1,3-phenylenecarbonyl).

By "MPD-T" it is meant poly(imino-1,3-phenyleneiminocarbonyl-1,4-phenylenecarbonyl).

By "MPD-I" it is meant poly(imino-1,3-phenyleneiminocarbonyl-1,3phenylenecarbonyl).

By "N,N'-di-sec-butyl-PPD-T" it is meant PPD-T that is substituted on both amide nitrogen atoms with a sec-butyl group, such as the PPD-T polymer prepared using N,N'-bis(1-methylpropyl)-1,4-benzenediamine monomer.

By "v/o" it is meant volume percent.

By "ACS" it is meant apparent crystalline size.

The instant invention provides composite materials made wholly from aromatic polyamides, which have the advantage of better performance and less delamination than composites composed of chemically distinct components. Aromatic polyamides also can be used at higher temperatures than most other composites, up to about 400° C. This can be compared to materials wherein the aramid is the matrix and a non-aramid fiber is embedded therein or where the matrix is non-aramid and the fiber is an aramid, for example aramids in polyether ketones, polyether sulfones and epoxy resins (all of which can be used up to about 200° C. or less).

Two types of composites that can be made wholly from aromatic polyamides are fiber reinforced foam and foam/felt laminate. The fiber reinforced foam can consist of aromatic polyamide fibers embedded in a matrix of aromatic polyamide foam, such as the foam described in U.S. Pat. Nos. 4,178,419 and 4,226,949, herein incorporated by reference. The foam/felt laminate can be made using any type of aromatic polyamide felt, such as that commercially available from the DuPont Company, Wilmington, Del. The use of alkylated monomers to prepare the foam matrix allow solvents to be used that will not degrade or dissolve the fibers and felt.

The N-alkyl groups of the aromatic diamines suitable for preparing the starting polyamide for the foam should have 2 to 8 carbon atoms and at least one β-hydrogen atom. Alkyl groups having at least 4 carbon atoms and an unsymmetrical structure are preferred since these diamines provide N-alkyl aromatic polyamides having lower melting points and greater solubility than alkyl groups having fewer carbon atoms and/or a symmetrical structure. N,N'-dialkyl-phenylene-diamines are preferred and N,N'-dialkyl-p-phenylene-diamines are most highly preferred. Suitable N-alkyl groups are ethyl, propyl, isopropyl, butyl, isobutyl, sec-butyl, t-butyl, pentyl, octyl, 1-ethyl-3-methyl-pentyl, 1-methyl-heptyl, cyclohexyl, 1,4-dimethylpentyl, and 1,3-dimethylbutyl. Preferred dicarbonyl chlorides are isophthaloyl chloride, terephthaloyl chloride, 2,6-naphthalene dicarbonyl chloride, 4,4'-bibenzoyl chloride, 3,4'-bibenzoyl chloride and substituted derivatives thereof wherein the substituents are inert to the polymerization and foam forming reactions.

The N,N'-dialkyl aromatic polyamide foam starting materials are best prepared by reaction of one or more of the above mentioned N,N'-di-alkylaromatic diamines with an aromatic dicarbonyl chloride at high temperature (about 150° C.) in a solvent such as mineral oil, o-dichlorobenzene, 1,2,4-trichlorobenzene, diphenylether, or pyridine. Optionally, a tertiary amine acid acceptor may be used. The N,N'-dialkylaromatic polyamides are conveniently isolated by cooling the mixture whereupon the polymer precipitates or by precipitation with a nonsolvent such as hexane. The N,N'-dialkyl aromatic polyamides should have an inherent viscosity of at least 0.25. The amount of N-substitution should be sufficient to provide a polymer having a suitable melting point.

The preparation of the foam materials is conveniently carried out starting from a solution or suspension of the N,N'-dialkylaromatic polyamide in a suitable solvent such as o-dichlorobenzene. Other suitable solvents are 1,2,4-trichlorobenzene and diphenyl ether. If these solvents are used for the polymerization reaction the polymer need not be isolated.

The catalyst for the dealkylation is an aryl sulfonic acid present in an amount of about 1 to 10% wt. based on the N,N'-dialkyl aromatic polyamide. Suitable aryl sulfonic acids are e.g., benzenesulfonic acid, p-toluenesulfonic acid, o-toluenesulfonic acid, m-toluene sulfonic acid, xylene-sulfonic acids, α- or β-naphthalene sulfonic acid etc. Benzenesulfonic acid is preferred.

The foam material can be applied to the surface of a polyaramid felt to yield a foam/felt laminate composite. The foam precursor is applied to the surface of the polyaramid felt in any manner, and then heated to complete the reaction and prepare the foam itself. When this occurs, the foam flows into the interstices of the felt, hardening and bonding to the felt, forming a solid composite at the felt/foam interface. The polyaramid felt can be prepared in many different ways. One method applicable to polyaramid felts is found in U.S. Pat. No. 4,361,619, hereby incorporated by reference. The filter felt of U.S. Pat. No. 4,361,619 may be prepared by (1) blending poly(tetrafluoroethylene) fibers with glass fibers in a picker followed by (2) one or two passes through a suitable carding machine to provide a web of an intimate blend of poly(tetrafluoroethylene) and glass fibers, (3) cross-lapping the carded web from the carding machine and combining the resulting batt into a layered batt, if necessary, to provide the desired weight, (4) lightly needling the layered batt on one or both sides using a needle loom and (5) further needling the batt on one or both sides either alone or when combined on one or both sides of a woven scrim to produce a felt. The batts of blended fibers may also be prepared using an air-lay. As described in U.S. Pat. No. 4,361,619, the felt may be heat set if desired by placing the uncompacted felt on a tenter frame and passing the felt through an oven. A tenter frame is a device well known by those skilled in the art. The tenter frame provides means for holding the edges of the felt during heat treatment, for example, pins, which pull the felt through the oven and prevent excessive shrinkage of the felt. An aramid felt may be prepared according to the following steps:

(a) passing aromatic polyamide fibers through a suitable carding machine to provide a web;

(b) cross-lapping the carded web from the carding machine and combining the resulting batt into a layered batt, if necessary, to provide the desired weight;

(c) lightly needling the layered batt on one or both sides using a needle loom; and (d) further needling the batt on one or both sides to produce a felt.

To prepare the "matrix" of a fiber reinforced foam composite, a mixture of N,N'-dialkyl aromatic polyamide, solvent and catalyst is heated while permitting the solvent to distill and then further heated at a temperature of 250° C. to 340° C. to effect dealkylation and create the foam. In order to avoid degradation of the polymer, the heating should be for as short a time and at as low a temperature as are commensurate with obtaining a completely dealkylated product. Incompletely dealkylated products are excessively flammable, apparently because of further alkene being split off under conditions of combustion. Advantages of a solid skin are its improved impact resistance and decreased moisture ingression. Use of a solid skin avoids the need to use a separate external laminated skin and allows the structure to lay flat against the foil heating surfaces that are required for thermal insulation uses.

Figure 3A:
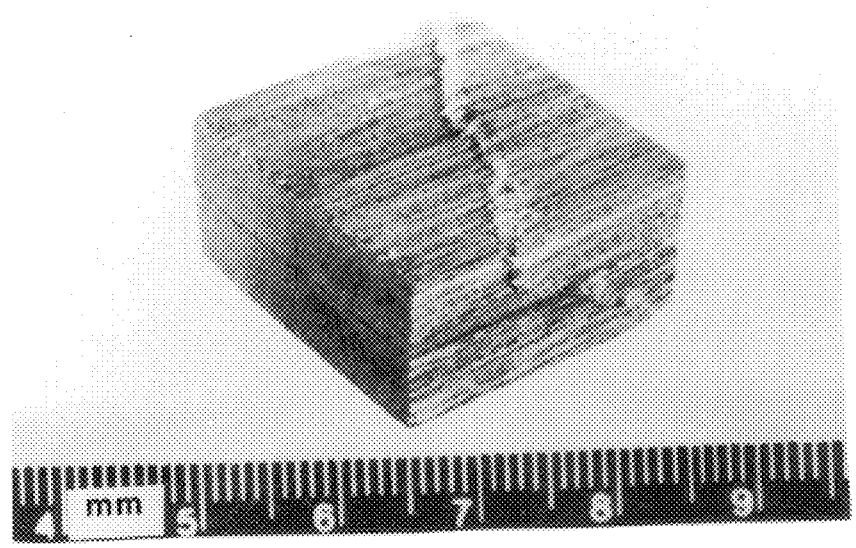
FIGS. 3(a), 3(b) and 3(c) are photographs of three specimens of Kevlarx aramid fiber reinforced PPD-T foams.
Figure 3B:
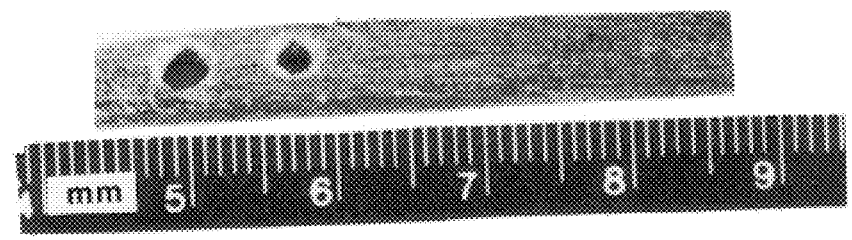
Figure 3C:
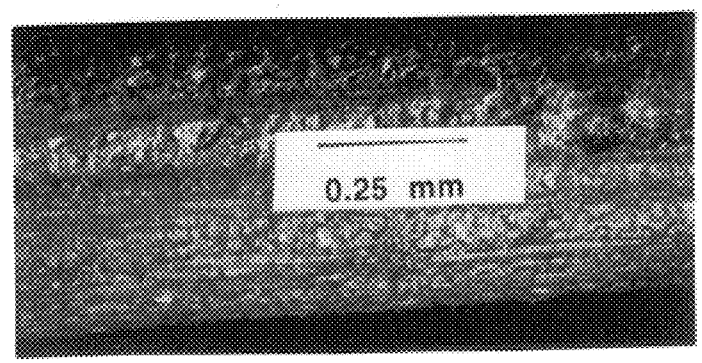

FIGS. 3(a), (b) and (c) show specimens of aramid reinforced foams. These materials bear a resemblance to wood in their appearance, their machinability and their failure mode in compression. The specimens were cut on a band saw and the sample with holes 3(b) was drilled with a mechanical wood drill. In the case of the sample shown in FIG. 3(c), turning was carried out on a lathe using a hand bastard file with a subsequent surface smoothing using a mill smooth file, 204A, 400A and 600A Type Tufback Durite sand paper. Respectively.

Although it is recognized that there are many methods by which the fiber reinforced foam composites can be made, one possible method is as follows:

1. Prepare N,N'-di-sec-butyl-PPD-T from terephthaloyl chloride and N,N'-di-sec-butyl-p-phenylene diamine (an antioxidant is available from Universal Oil Products, Des Plains, Ill.) via high temperature solution polymerization in ortho-dichlorobenzene.

2. Dissolve N,N'-di-sec-butyl-PPD-T in o-dichlorobenzene to form a 50% solution, then add about 0.5% benzenesulfonic acid dealkylation catalyst.

3. Remove at least 75% o-dichlorobenzene by distillation giving plasticized melt at about 200° C.

4. Coat PPD-T yarn (available from the DuPont Company, Wilmington, Del.) by running strands through melt and up through die to control add-on.

5. Place parallel array of coated strands of yarn in a bar mold.

6. Heat (about 3 h.) under nitrogen using vacuum bag procedure at programmed temperatures from room temperature up to as high as 340° C. then cool under nitrogen. Specimen thickness and compaction control can be controlled via degree of foaming, pressure and shims.

To illustrate the outstanding potential of these reinforced foams, compressive and flex strength data are shown below as compared to a fully consolidated Kevlar® 49//epoxy composite and Nomex® honeycombs. Particularly notable is the high compressive strength for the foamed composite at only 12 v/o fiber loading (1/5 that for the Kevlar®//epoxy composite) which is indicative of good bonding, considering that the matrix is foamed. This assertion is supported by the very good normalized flexural data for the 1.16 g/cc foamed composite.

TABLE 1

Mechanical Properties[a] of Unidirectional Kevlar ® //PPD-T "Mimetic" Molecular Composites versus Kevlar ® //Epoxy, Selected Molecular Composites and Other Representative Materials

| Material | Composite Density g/cc | Kevlar ® Volume % | PPD-T Volume % | Compressive Strength MPa | Tensile Strength MPa | Tensile Modulus GPa | Flexural Strength MPa | Flexural Modulus GPa |
|---|---|---|---|---|---|---|---|---|
| Kevlar ® 49//PPD-T | 1.15 | 29 | 51 | — | — | — | 300 600[b] | 24 50[b] |
| Kevlar ® 49//PPD-T | 0.89 | 27 | 34 | — | 260 580[b] | 15 34[b] | — | — |
| Kevlar ® 49//PPD-T | 0.71 | 12 | 40 | 76 380[b] | — | — | — | — |
| Kevlar ® 49//PPD-T | 0.63 | 14 | 29 | 73 310[b] | — | — | 140 600[b] | 12 53[b] |
| Kevlar ® 49//PPD-T | 0.23 | 9 | 7 | 15 100[b] | — | — | — | — |
| PPD-T | 0.14 | — | 10 | 0.90 | — | — | — | — |
| PPD-T | 0.17 | — | 12 | 2.8 | — | — | — | — |
| Kevlar ® 49// Epoxy 3501-6 (60/40 v/o) | 1.38 | 60 | — | 280 | 1450 | 75 | 620 | 62–76 |
| Nomex ® Honeycomb | 0.14 | — | — | 11 | — | — | — | — |

[a]In general, results are for single specimens and are measured parallel to fiber axis with the exception of flexural properties which are normal to fiber axis. Method: Felx - ASTM D790-84a; Tensile - ASTM D3039-76; Compressive - ASTM D695-84
[b]Normalized to 60 v/o for comparison with Kevlar 49//Epoxy (60/40 v/o)

Uses of the composites described include flex-circuit heater supports, solar panels, fire walls, aircraft and race car composites, light boats and engine compartments, racing hulls, bulk heads, air-drop skids, ovens, fire proof fuel storage, fire shields, light weight aircraft constructs, high-glider structured parts, helmets, military equipment, bearings, friction pads for high temperature uses, aircraft shipping containers, explosion containment devices, heating pads and food warmers, high temperature pallets and in autoclaves and sterilizers. These composites can be easily machined into a variety of wood-like shapes.

The following Examples are meant to illustrate the invention but are not intended to limit it in any way.

Materials and Methods

Kevlar® is the E. I. du Pont de Nemours and Company (DuPont) trademark for poly(imino-1,4-phenyleneiminocarbonyl-1,4-phenylenecarbonyl). All forms of Kevlar® used in the Examples were obtained from DuPont, Wilmington, Del. 19898.

EXAMPLES

Example 1

Impregnation of Kevlar® 49 Yarn with N,N'-Di-s-BuPPD-T

Figure 2:
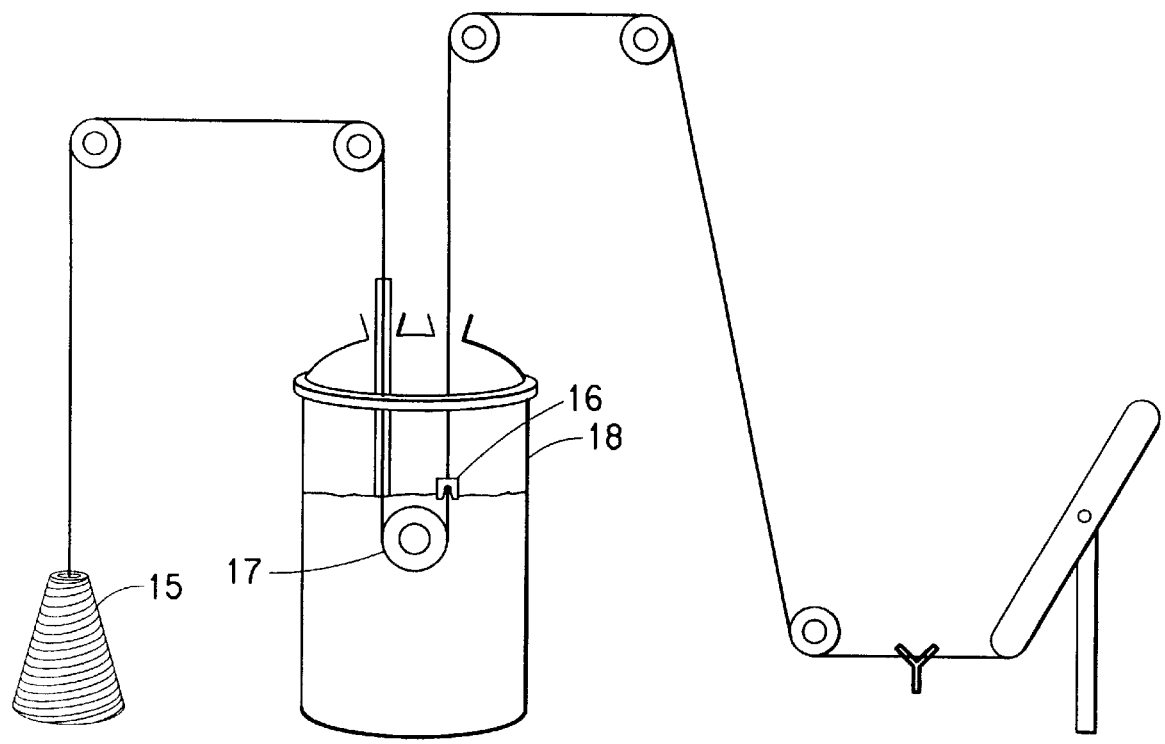
FIG. 2 is a process schematic for coating Kevlar® 49 yarn with PPD-T foam precursor.

To a 250 mL round bottom flask equipped with a glass shaft and Teflon® stirrer blade, nitrogen inlet and Claisen head connected to condenser and graduated cylinder were added 100 mL o-dichlorobenzene, 0.54 9. of benzenesulfonic acid and 50 9. of N,N'-di-s-BuPPD-T with inherent viscosity of 0.49. The N,N'-di-s-BuPPD-T was prepared as described in U.S. Pat. No. 4,178,419. The flask was inserted into a 255° C. oil bath where clear solution was obtained in a short time and before distillation of the o-dichlorobenzene began. About 70 mL of the o-dichlorobenzene was removed by distillation. The stirrer was removed from the system and utilizing the apparatus shown in FIG. 2, the yarn 15 was coated with the plasticized melt. The yarn 15 was first threaded through a spinneret-type die 16 which was attached to a stainless steel wire threaded with 195 denier Kevlar® 49 which holds the spinneret in place. The die 16 was lowered into the melt 17 taking care to keep the top above the level of the melt. The die removes excess coating. The angle of the yarn approaching the die was kept at about 90° using a stainless steel wire guide in the form of a "pigtail" (not shown). The yarn was taken through the die 16 at about 20 m/min. The melt solidified within seconds after exiting the flask 18 for there was little sticking. The coated yarns had a denier of about 1000 versus 195 for the Kevlar® 49 yarn.

Formation of Composite Using Vacuum Bag Procedure

577–15.2 cm long coated strands with a total weight of 9.7436 g. (wt. % add-on=80) from above were arranged in a parallel array in the mold and the pressure bar inserted and pushed down snug by hand. The mold was then placed in the "vacuum bag" apparatus. The vacuum bag apparatus lay-up is shown in FIG. 1 and consists of the following elements:

upper platen (not shown);

Kapton® film (2 mil) vacuum bag cover 2;

high temperature sealant tape on lip of vacuum can 3;

Teflon® coated porous glass fabric (does not cover lip of vacuum can) 4;

mold ram (or press bar) 5;

Kapton® film (2 mil) (held to press bar with transfer tape #463) 6;

foam or composite precursor 7;

Kapton® film 8;

lift bar (screw driven ) 9;

bottom of mold with lift bar holder 10;

bottom of can (in some cases contains spacers) 11;

vacuum port with thermocouple attached to short side of can 12; and thermocouple 13.

The apparatus was heated in a Pasadena press according to the conditions shown below. Upon cooling to about 100° C. the assembly was removed from the press and the mold removed and opened, and the bar composite forced out with the lift bar. The bar weight was 5.379 g. and had dimensions of 0.24 cm thick by 1.27 cm wide by 15.2 cm long. The calculated density was 1.16 g/cc.

TABLE II

Preparation of High Density Kevlar ® 49//PPD-T Composite

| Time, min. | Temp., °C. | Mold Vac., mm Hg | Platen Pressure, psi |
|---|---|---|---|
| 0 | 22 | <8 | 15 |
| 30 | 71 | <8 | 15 |
| 90 | 172 | <8 | 15 |
| 105 | 192 | <8 | 15 |
| 110 | 210 | <8 | 15 |
| 120 | 232 | <8 | 15 |
| 135 | 244 | <8 | 15 |
| 145 | 244 | <8 | 15 |
| 155 | 247 | <8 | 330 |
| 240 | 284 | <8 | 330 |
| 260 | 280 | <8 | 330 |
| 275 | 288 | <8 | 330 |
| 285 | 293 | <8 | 330 |
| 305 | 299 | <8 | 330 |
| 315 | 302 | <8 | 330 |
| 360 | 295 | <8 | 330 |
| 375 | 304 | <8 | 330 |
| 395 | 306 | <8 | 330 |
| 405 | 283 | <8 | 330 |
| 425 | 211 | 1 atm. | 15 |

Example 2

Preparation of Medium Density or Foamed Kevlar®//PPD-T Composite

Kevlar® 49 yarn was impregnated in same way as in Example 1. Yarn denier was about the same, 1020.

577–15.2 cm strands with a total weight of 9.9677 g were used. After charging into the apparatus as described in Example 1 the system was heated as according to conditions in table below. The foamed composite bar weighed 5.586 g. However, there was 0.71 g. of a dense fiber reinforced flashing which had extruded from top of mold. The bar had dimensions of 0.48 cm thick bar 1.27 cm wide bar 15.2 cm long. The calculated density was 0.63 g/cc.

TABLE III

Preparation of Medium Density or Foamed Kevlar ® 49//PPD-T Composite

| Time, min. | Temp., °C. | Mold Vac., mm Hg | Platen Pressure, psi |
|---|---|---|---|
| 0 | 19 | 4 | 15 |
| 25 | 40 | 4 | 15 |
| 50 | 95 | 4 | 15 |
| 80 | 152 | 4 | 15 |
| 110 | 202 | 4 | 15 |
| 125 | 226 | 4 | 15 |
| 150 | 254 | 4 | 10,000* |
| 200 | 272 | 4 | 10,000* |
| 250 | 307 | 4 | 10,000* |
| 90 | 327 | 4 | 10,000* |
| 300 | 324 | 4 | 10,000* |
| 310 | — | 1 atm | 10,000* |

*At 150 min the external pressure high external pressure applied apparently resulted in the extrusion of the high density fiber reinforced flashing noted above.

Example 3

Preparation of Low Density or Foamed Kevlar®//PPD-T Composite

Yarn was impregnated as in Example 1 above. Yarn denier was about the same, 1007.

288–15.3 cm strands with a total weight of 4.6756 g were used. After charging into the apparatus as described in Example 1 above the system was heated according to conditions shown below. The foamed composite bar weighed 3.4123 g. The dimensions were 0.81 cm thick by 1.22 cm wide by 15.3 cm long. The calculated density was 0.23 g/cc.

TABLE IV

Preparation of Low Density or Foamed Kevlar ®//PPD-T Composite

| Time, min. | Temp., °C. | Mold Vac., mm Hg | Platen Pressure, psi |
|---|---|---|---|
| 0 | 31 | 100 | 15 |
| 20 | 145 | 100 | 15 |
| 25 | 175 | 100 | 15 |
| 27 | 200 | 100 | 15 |
| 30 | 221 | 100 | 15 |
| 32 | 245 | 100 | 15 |
| 35 | 263 | 100 | 15 |
| 40 | 290 | 100 | 15 |
| 41 | 295 | 50 | 15 |
| 42 | 300 | 50 | 15 |
| 49 | 314 | 1 | 15 |
| 50 | 315 | 1 | 15 |
| 52 | 318 | 1 | 15 |
| 59 | 323 | 1 | 15 |
| 62 | 325 | 1 | 15 |
| 65 | 327 | 1 | 15 |
| 69 | 329 | 1 | 15 |
| 72 | 330 | 1 | 15 |
| 75 | 330 | 1 | 15 |
| 85 | 320 | 1 atm. | 15 |

Example 4

Preparation of PPD-T//N,N'-Di-s-BuPPD-T (56/44) Blend in $H_2SO_4$ for Film Casting $H_2SO_4$ (142 g. of 100.04%) in a 500 mL resin kettle with $N_2$ bleed and basket-type 356 stainless steel stirrer was cooled in "Dry Ice" until it became frozen. Kevlar® aramid commercial polymer (15 g., $h_{inh}$ 6.3) and N,N'-di-s-BuPPD/T (17.6 g., $h_{inh}$ 0.41) were added and the mixture stirred for about 15 min. at room temperature. An oil bath was put in place and after about 2 h it was noticed that the oil bath temp. had reached about 40° C. apparently from heat of mixing the polymers. At this point, the mixture consisted of a grayish paste. The temp. of the oil bath was raised to 45° C. and held for about 45 min. then to 70° C. and held for 1.5 h. Films were then cast with 2, 5 and 10 mil doctor blades on hot (about 100° C.) glass plates, then coagulated in room temperature water and neutralized by adding $NaHCO_3$. After standing over the weekend in aq. $NaHCO_3$, the films were rinsed with distilled water. Wet film thicknesses were 4-8, 5 and 10 mil, respectively, from the 2, 5 and 10 mil doctor blades.

Preparation of PPD-T//PPD-T Composite from PPD-T/N, N'-Di-s-BuPPD-T

Four 1.27 by 15.2 cm strips were cut from the PPD-T// N,N'-Di-s-BuPPD-T film from above and each dipped for 20 s in 50 cc of o-dichlorobenzene containing 0.54 g. of benzenesulfonic acid. The strips were hung vertically and blotted with paper towels to remove excess liquid. The four coated strips weighed 0.407 g. vs. 0.373 g. for the uncoated strips. The strips were placed one atop the other in the bar mold from Example 1. After closing the mold and transferring to the vacuum bag apparatus from Example 1, the assembly was purged with argon and evacuated with pump. The assembly was placed in a Pasadena press whose platens had been preheated to 266° C. The mold was heated under the following conditions:

TABLE V

| Time, min. | Mold Temp., °C. | Mold Press., mm Hg | Platen Pressure, psi |
|---|---|---|---|
| 0 | 65 | <5 | 1330 |
| 20 | 212 | " | " |
| 80 | 214 | " | " |
| 190 | 251 | " | " |
| 200 | 255 | " | " |
| 210 | 275 | " | " |
| 300 | 316 | " | " |
| 330 | 317 | " | " |
| 340 | 322 | " | " |
| 380 | 341 | " | " |
| 390 | 337 | " | " |

A 0.020 cm laminate was recovered vs. 0.036 cm for 4 plies of starting film. Density-0.62 g/cc. X-ray CI-0.47. ACS-39A.

Example 5

Preparation of PPD-T foam//Kevlar® aramid felt laminate

A 7.42 g. piece of Kevlar® 29 felt with dimensions of 7.6 cm by 15 cm by 0.65 cm was laid on top a micromilled mixture of 8 g. of N,N'-di-s-BuPPD-T resin ($h_{inh}$-0.9 dL/g) in 4 g o-dichlorobenzene containing 40 mg of benzenesulfonic acid. The latter was spread on 1 mil Kapton® film in a 7.6 cm by 15 cm mold. Four 4 mm high by 3 mm dia. brass spacers were placed in the corners of the Kevlar® felt to prevent compression of the laminate to a thickness of less than 4 mm by the press bar. The press bar was inserted and the mold placed in the vacuum bag apparatus from Example 1 which was then assembled in the standard way for a vacuum bag operation. The system was heated in a Pasadena press under a slight positive pressure of nitrogen with no external pressure applied to

TABLE VI

| Time, min. | Mold Temp., °C. |
|---|---|
| 0 | 30 |
| 60 | 185 |
| 70 | 192 |
| 100 | 270 |
| 105 | 285 |
| 110 | 295 |
| 125 | 297 |
| 130 | 299 |
| 140 | 300 |
| 145 | 203 |
| 510 | 303 |

The mold was allowed to cool in the press, and the laminate was recovered. Weight-12.9 g. (ca 42 wt. % PPD-T foam) Dimensions-0.51 cm thick×7.6 cm×15.2 cm. Density-0.22. Thickness of Foam-ca 1 mm.

What is claimed is:

1. A process for making a rigid fiber reinforced aromatic polyamide composite comprising the following steps:
   (a) preparing a matrix from an aromatic N,N'-dialkyl polyamide;
   (b) embedding in said matrix a non-alkylated aromatic polyamide in fiber form, wherein the solubility of the non-alkylated fiber differs from that of the alkylated matrix so as to form a composite of the two types of aromatic polyamides; and
   (c) heating said composite so as to dealkylate the matrix and so as to convert the matrix to the same polyamide as the fiber.

2. The process of claim 1 wherein the N,N'-dialkyl polyamide in step (a) has N-alkyl groups having 2–8 carbon atoms and at least one $\beta$-hydrogen atom.

3. A process for making an aromatic polyamide felt composite comprising
(a) preparing the felt according to the following steps;
   (i) passing aromatic polyamide fibers through a suitable carding machine to provide a web;
   (ii) cross-lapping the carded web from the carding machine and combining the resulting batt into a layered batt, if necessary, to provide the desired weight;
   (iii) lightly needling the layered batt on one or both sides using a needle loom; and
   (iv) further needling the batt on one or both sides to produce a felt;
(b) coating said felt with N,N'-dialkyl polyamide, wherein the solubility of the coating differs from that of the felt; and
(c) then heating said coated felt so as to dealkylate the coating and so as to convert the coating to the same polyamide as the polyamide felt, forming a composite at the interface of the coating and the felt.

4. The process of claim 1 wherein the resulting aromatic polyamide foam composite is selected from the group of PPD-T, PPD-I, MPD-T, and MPD-I.

5. The process of claim 3 wherein the resulting aromatic polyamide felt composite is selected from the group of PPD-T, PPD-I, MPD-T, and MPD-I.

6. The process of claim 5 wherein the aromatic polyamide is PPD-T.

* * * * *